United States Patent
Williams et al.

(10) Patent No.: US 11,661,784 B2
(45) Date of Patent: May 30, 2023

(54) DETECTION DEVICES FOR HAZARD DETECTION FOR AUTOMOTIVE CLOSURES

(71) Applicant: TOYOTA MOTOR ENGINEERING & MANUFACTURING NORTH AMERICA, INC., Plano, TX (US)

(72) Inventors: Paxton S. Williams, Milan, MI (US); Scott L. Frederick, Brighton, MI (US); Scott P. Robison, Dexter, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 335 days.

(21) Appl. No.: 16/407,847

(22) Filed: May 9, 2019

(65) Prior Publication Data

US 2020/0355013 A1   Nov. 12, 2020

(51) Int. Cl.
| | |
|---|---|
| *G08B 21/00* | (2006.01) |
| *E05F 15/73* | (2015.01) |
| *B60Q 9/00* | (2006.01) |
| *G08B 7/06* | (2006.01) |

(52) U.S. Cl.
CPC .............. *E05F 15/73* (2015.01); *B60Q 9/008* (2013.01); *G08B 7/06* (2013.01); *E05F 2015/763* (2015.01); *E05F 2015/765* (2015.01); *E05F 2015/767* (2015.01); *E05Y 2900/531* (2013.01); *E05Y 2900/536* (2013.01); *E05Y 2900/542* (2013.01); *E05Y 2900/546* (2013.01)

(58) Field of Classification Search
CPC ................ E05F 15/73; E05F 2015/765; E05F 2015/763; E05F 2015/767; B60Q 9/008; B60Q 1/48; B60Q 5/006; G08B 7/06; E05Y 2900/531; E05Y 2900/546; E05Y 2900/542; E05Y 2900/536; G08G 1/166; B60R 16/0232
USPC .......................................................... 701/49
See application file for complete search history.

(56) References Cited

U.S. PATENT DOCUMENTS

| | | |
|---|---|---|
| 5,801,340 A | 9/1998 | Peter |
| 9,484,914 B2 | 11/2016 | Pohl |
| 9,688,199 B2 | 6/2017 | Koravadi |
| 10,161,175 B2 | 12/2018 | Elie et al. |

(Continued)

*Primary Examiner* — Mark S Rushing
(74) *Attorney, Agent, or Firm* — Oblon, McClelland, Maier & Neustadt, L.L.P.

(57) ABSTRACT

A method of using detection devices for hazard detection when activating a physical closure member of an automobile generates a combined output signal from a first-detection device having a first-operational range and a second-detection device having a second-operational range. The combined output signal is generated for activity detected within a full-operational range, wherein the full-operational range is a mathematical union of the first-operational range and the second-operational range. A cumulative safety threshold is determined for the physical closure member using processing circuitry. Hazard-related data within the combined output signal is analyzed using processing circuitry. If the hazard-related data exceeds the cumulative safety threshold, a current state of the physical closure member is changed. If the hazard-related data does not exceed the cumulative safety threshold, a current state of the physical closure member is maintained.

16 Claims, 5 Drawing Sheets

(56) References Cited

U.S. PATENT DOCUMENTS

| | | | |
|---|---|---|---|
| 2005/0269833 A1* | 12/2005 | Park | B60J 5/101 |
| | | | 296/146.8 |
| 2006/0191203 A1* | 8/2006 | Ueda | G01L 1/16 |
| | | | 49/27 |
| 2007/0188312 A1* | 8/2007 | Bihler | B60R 21/0134 |
| | | | 340/435 |
| 2013/0060429 A1* | 3/2013 | Kim | B60K 28/12 |
| | | | 701/48 |
| 2015/0232027 A1* | 8/2015 | Freitas | B60Q 9/008 |
| | | | 340/435 |
| 2017/0089114 A1* | 3/2017 | Rider | G01L 19/083 |
| 2017/0305343 A1* | 10/2017 | Wu | B60Q 9/008 |
| 2017/0306684 A1 | 10/2017 | Baruco et al. | |
| 2018/0016835 A1 | 1/2018 | Ichinose | |
| 2018/0238099 A1 | 8/2018 | Schatz et al. | |
| 2018/0336786 A1 | 11/2018 | Salter et al. | |
| 2019/0211587 A1* | 7/2019 | Ganeshan | B60R 21/0153 |
| 2020/0318402 A1* | 10/2020 | Herthan | B60J 5/0468 |

* cited by examiner

DETECTION DEVICES FOR HAZARD DETECTION FOR AUTOMOTIVE CLOSURES

BACKGROUND

Field of the Invention

The present disclosure relates to using sets of detection devices to control automotive closures.

Description of the Related Art

Automobiles adopt proximity sensors for a plethora of applications. Most of the applications are related to detecting objects during dynamic driving conditions. As an example, proximity sensors are currently used for applications such as adaptive cruise control, emergency braking, traffic sign recognition, and parking assistance.

SUMMARY

The method of the present disclosure utilizes detection devices including proximity sensors to prevent damage and/or injury in a variety of scenarios when an automobile is static (i.e., not moving). For example, consider a situation where a wireless controller is used to operate an automotive closure. The user may be unaware of the surroundings of the automotive closure. As a result, the automotive closure can be damaged when opened/closed or injure an individual in the vicinity. As an example, a tailgate of a pick-up truck can be damaged if the tailgate is opened towards a wall undetected by the user. In another instance, opening the tailgate can injure an individual if the individual is in the immediate vicinity of the remotely controlled tailgate.

In order to address the aforementioned issues, among others, detection devices which heretofore have been used to monitor dynamic driving conditions of a vehicle can be used to monitor and control an opened/closed configuration of an automotive closure when an automobile is in a static condition. The disclosed methods/systems not only alert the user, but also can prevent an automotive closure from opening when a hazard is identified. Thus, potential damage and/or injury can be prevented.

The detection devices are communicably coupled with a central processing unit (CPU) of the automobile. When a potential hazard is detected by the detection devices a corresponding signal is sent to the CPU. Based upon embedded data within the corresponding signal, the CPU controls the position of the automotive closure. If the embedded data indicates a hazard is present, the automotive closure remains in a closed configuration. If the embedded data reflects that no hazard is present, the automotive closure is repositioned to an open configuration.

BRIEF DESCRIPTION OF THE DRAWINGS

A more complete appreciation of the invention »and many of the attendant advantages thereof will be readily obtained as the same becomes better understood by reference to the following detailed description when considered in connection with the accompanying drawings, wherein.

DETAILED DESCRIPTION OF THE INVENTION

All illustrations of the drawings are for the purpose of describing selected versions of the present disclosure and are not intended to limit the scope of the present disclosure.

The present disclosure introduces a method of using detection devices to detect hazardous situations when an automobile is stationary. By implementing the method of the present disclosure, potential damage to an automotive closure or potential injuries to an individual in the immediate vicinity of the automotive closure can be prevented.

Figure 4:
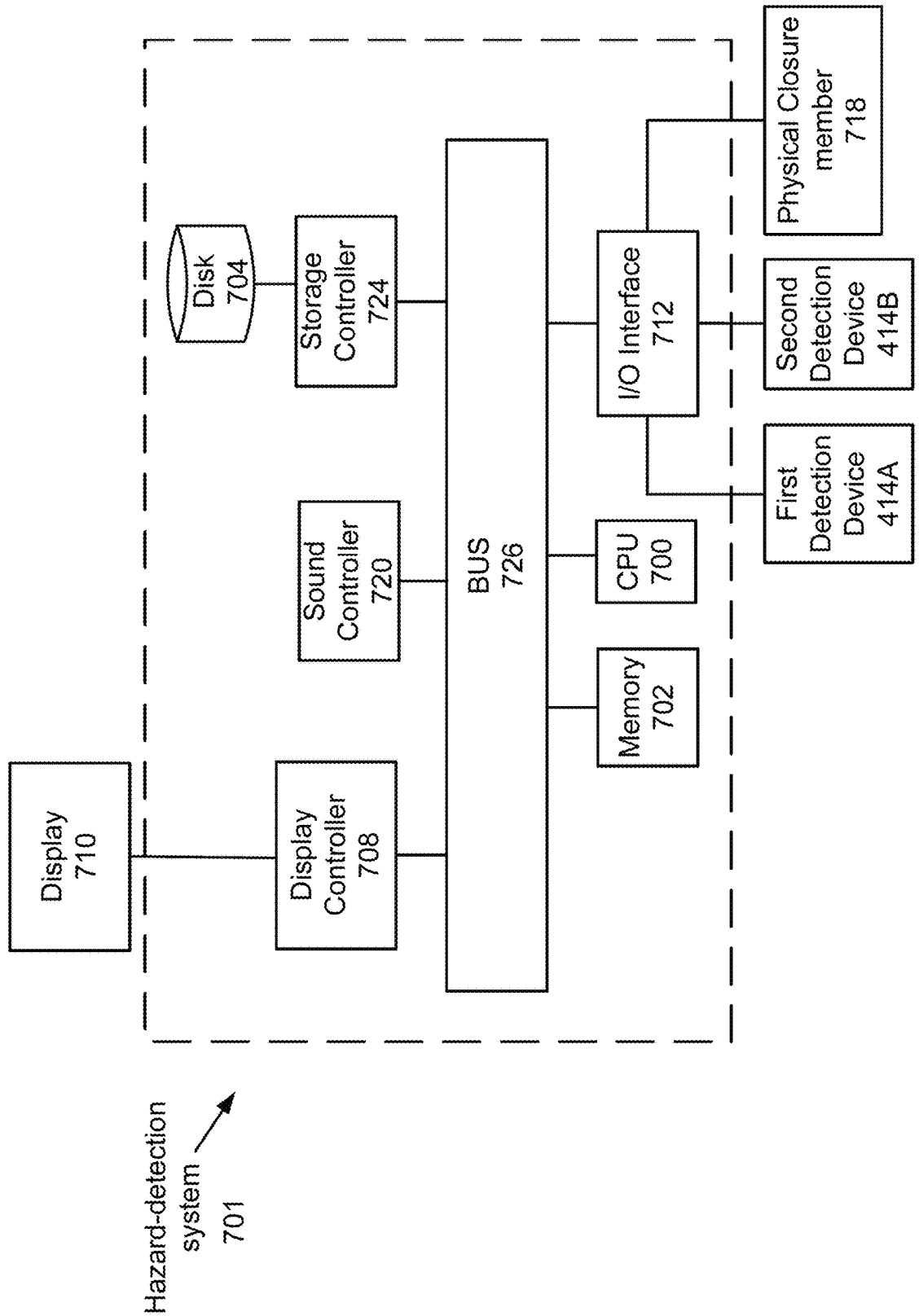
FIG. 4 is a block diagram illustrating a non-limiting example of the system for implementing the hazard detection.

As illustrated in FIG. 4, to fulfill the intended functionalities, a first-detection device 414A and a second-detection device 414B are communicably coupled with a central processing unit (CPU) 700, commonly referred to as a processing circuitry, of an automobile. A full-operational range corresponding to the effective combined detection ranges of both the first-detection device 414A and the second-detection device 414B is provided adjacent a physical closure member 718 of the automobile. Thus, any activity within the full-operational range can be detected by the first-detection device 414A or the second-detection device 414B. The processing circuitry, represented by the CPU 700. is programmed to control the physical closure member 718 and thus the opening/closing operation of the physical closure member 718 can be controlled safely through the CPU 700.

Figure 1:
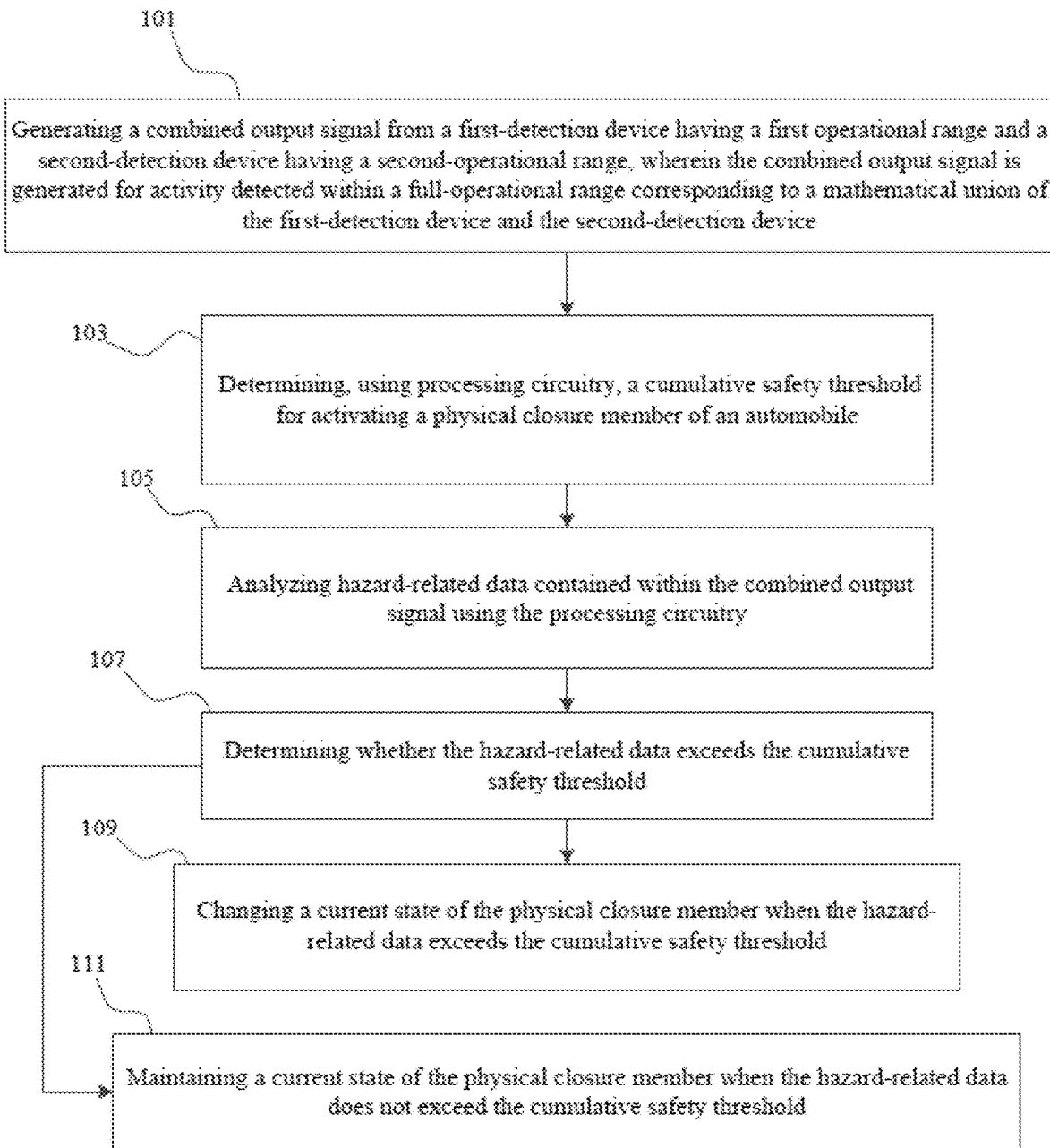
FIG. 1 is a flowchart illustrating the overall process of the present disclosure.

As illustrated in FIG. 1, as an initial step of the hazard detection process, in step 101 a combined output signal is generated from the first-detection device 414A and the second-detection device 414B. However, a first output signal generated from the first-detection device 414A and a second output signal generated from the second-detection device 414B can also be analyzed separately. More specifically, the combined output signal is generated for activity detected within the full-operational range of both the first-detection device 414A and the second-detection device 414B so that the CPU 700 can determine if the physical closure member 718 can be opened/closed. It may be optimal to have the full-operational range preprogrammed into the automobile based upon the automobile specifications that can be, but are not limited to, automobile type and a type/length of the physical closure member 718. The first detection device 414A and the second detection device 414B can also be calibrated for the full-operational range at first use. For example, if the physical closure member 718 is a tailgate, the first detection device 414A and the second detection device 414B can detect that the automobile is a truck after first use of the tailgate, and the full-operational range determined accordingly. In this case, the first detection device 414A and the second detection device 414B should have the ability to recalibrate according to varying automobile modifications.

Figure 2:
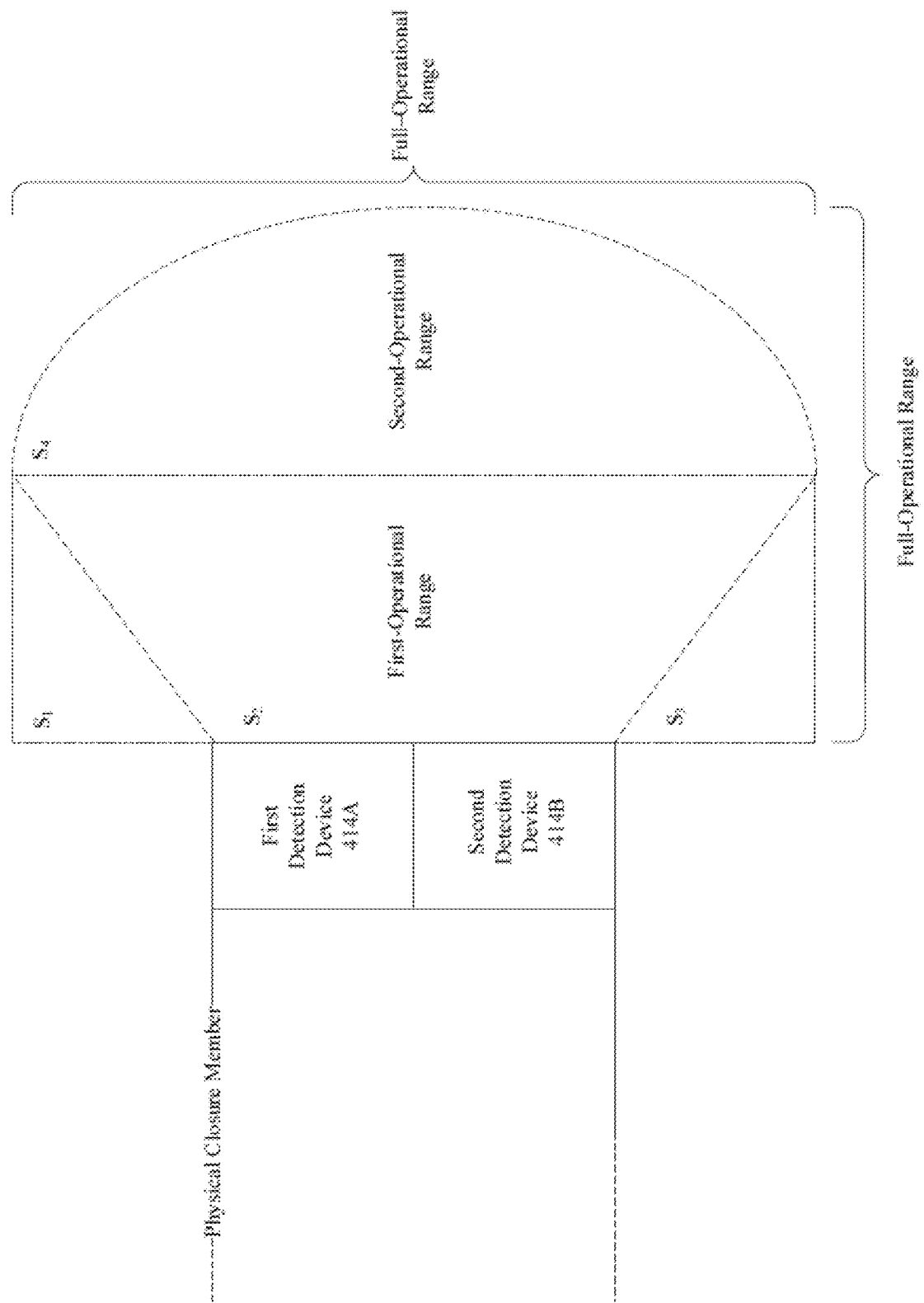
FIG. 2 is an illustration of a first-operational range and a second-operational range provided by a first-detection device and a second-detection device.

As shown in FIG. 2, a combination of sensors can be used to expand the full-operational range. As an example, the first-detection device 414A can be associated with a first-operational range and the second-detection device 414B can be associated with a second-operational range. In this example, the first-operational range is rectangular in shape and the second-operational range is conical in shape. As discussed earlier, when the combined output signal is generated as shown in step 101 of FIG. 1, the processing circuitry combines the first-operational range and the second operational range to develop the full-operational range. In particular, the full-operational range is a mathematical union of the first-operational range and the second-operational range.

In step 103, the processing circuitry of the CPU 700 determines a cumulative safety threshold for activating the physical closure member 718 according to the minimum requirements that need to be fulfilled for the physical closure member 718 to open/close. The minimum requirements can be determined when the first detection device 414A and the second detection device 414B are calibrated during the first use of the physical closure member 718. The minimum requirements can be, but are not limited to, an operation locus of the physical closure member 718 and a safe range of use. As an example, if a distance between an object and the operation locus is 5-milimeters (mm), and the safe range of use is defined to be greater than 5-mm from the operation locus, any object within a distance less than 5-mm is considered an obstacle that can damage the physical closure member 718, Therefore, to exceed the cumulative safety threshold, the object needs to be at a distance greater than 5-mm As shown in step 105 of FIG. 1, in the process of determining if the physical closure member 718 can be opened, a predictive calculation module managed by the CPU 700 analyzes hazard-related data provided within the combined output signal. The purpose of the predictive calculation module is to predict if a potential hazard corresponding to the hazard-related data will contact the physical closure member 718 during opening/closing. As an example, if an individual is walking towards the physical closure member 718, the predictive calculation module predicts the time the individual will take to reach the physical closure member 718 by using the hazard-related data. Next, the predictive calculation module predicts if the physical closure member 718 can be opened/closed before the individual reaches the physical closure member 718, wherein the minimum requirements to open/close the physical closure member 718 are given by the cumulative safety threshold.

The hazard-related data can be, but is not limited to, information regarding a static hazard or, a dynamic hazard. As an example, the hazard-related data can provide information regarding a wall that is in the immediate vicinity of the physical closure member 718. In another instance, the hazard-related data can provide information regarding an individual walking towards the physical closure member 718 or walking away from the physical closure member 718. In another instance, wherein an object is moving towards the physical closure member 718, the hazard-related data can provide trajectory information associated with the object moving towards the physical closure member 718. In general, the hazard-related data of the combined output signal provides information regarding an obstacle/individual that can cause damage or be injured by opening the physical closure member 718.

When analyzing the hazard-related data is complete, the predictive calculation module determines in step 107 if the hazard-related data exceeds the cumulative safety threshold. If the hazard-related data exceeds the cumulative safety threshold, wherein the full-operational mode is free, of any hazards, the CPU triggers the physical closure member 718 into changing a current state of the physical closure member 718 (Step 109). If the hazard-related data does not exceed the cumulative safety threshold, wherein a potential hazard is determined to be within the full-operational mode, the CPU controls the physical closure member 718 to maintain a closed configuration (Step 111), or vice-versa depending whether the potential hazard may occur when the physical closure is opening or closing.

A notification module can be communicably coupled with the CPU to provide a notification when the physical closure member 718 is triggered to remain in its current state (e.g., the closed configuration). Thus, when a hazard is present in the full-operational range, and the hazard-related data does not exceed the cumulative safety threshold, the notification module can issue a notification to alert a user. The notification can vary in different embodiments of the present disclosure. The notification can be, but is not limited to, an audible alarm or a warning light. As an example, then a user is manually operating the physical closure member 718, a warning light positioned adjacent the physical closure member 718 can be illuminated to notify the user of a hazard. In another embodiment, when the CPU is communicably coupled with a corresponding personal-computing (PC) device of the user, the notification can be a text message. In a different embodiment, if the user utilizes a remote keyless entry (RKE) method to control the physical closure member 718, a vibrating motion can be used to notify the user. As an example, consider using a key fob in the RKE method, In this instance, if the key fob is communicably coupled with the CPU, the vibrating motion can notify the user by vibrating the key fob.

Figure 5:
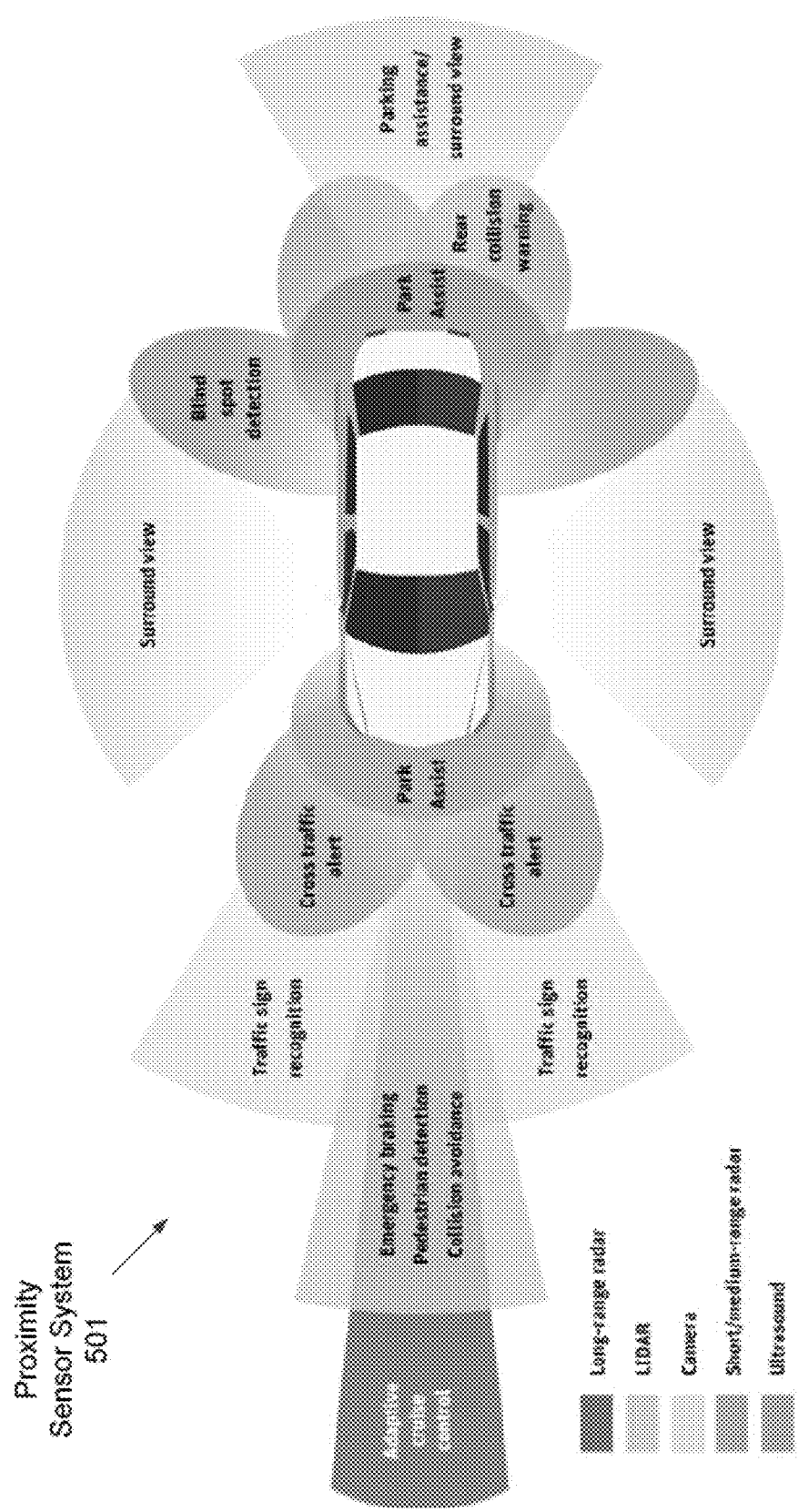
FIG. 5 illustrates exemplary proximity sensors used for autonomous applications which can be adapted for hazard detection according to the present disclosure.

The hazards surrounding the automobile in a static scenario can vary from one location to another. In order to obtain accurate information regarding the constantly varying surroundings, the first-detection device 414A and the second-detection device 414B are selected from the group including proximity sensors, long-range radars, short/medium-range radars, light detection and ranging (LiDAR) sensors, cameras, ultrasound sensors, and combinations thereof as seen'in the proximity sensor system 501 of FIG. 5.

As an example, when LiDAR sensors are used for the first detection device 414A and the second detection device414B, the full-operational range is initially separated into linear zones through a plurality of nodes associated with the LiDAR sensors. The number of nodes used as the plurality of nodes can be, but is not limited to, a range, of 100-150. When the physical closure member 718 is to be opened/closed manually or remotely, the plurality of nodes is monitored and the combined output signal is generated. Based upon the hazard-related data within the combined output signal, the physical closure member 718 changes the current state or maintains the current state.

In addition to being able to adjust to varying surroundings, using a combination of sensors as the first-detection device 414.E and the second-detection device 414B expands the full-operational range. As an example, consider the first-detection device 414A to be a camera and the second-detection device 414B to be a proximity sensor. The detection range of the camera (414A) is limited. Therefore, a potential hazard that is out of range of the camera 414A, but is within the vicinity of the physical closure device 718 may not be detected. However, if the proximity sensor (414B) is working in conjunction with the camera (414A), the potential hazard can be detected by the proximity sensor (414B). Therefore, hazards positioned at varying distances with varying characteristics can be identified through the combination of the first-detection device 414A and the second-detection device 414B.

Further referring to FIG.2, the first-operational range consists of detection regions $S_1$, $S_2$, and $S_3$. The second-operational range consists of detection regions $S_2$ and $S_4$. In this example, $S_2$, is an overlapping area for both the first-operational range and the second-operational range. Thus, the full-operational range consists of $S_1+S_2+S_3+S_4$. However, the full-operational range can consist of multiple-operational ranges that are adjacent to each other with no overlapping range and can be generated from three or more detection devices.

Referring to FIG.2 and the previous example, wherein the first-detection device 414A is a camera and the second-detection device 414B is a proximity sensor, a potential hazard in $S_4$ will not be detected, by the camera (414A). However, since region $S_4$ is encompassed by the full-operational range, the combined output signal generated for the full-operational range provides information regarding the potential hazard in $S_4$.

In another instance, a potential hazard within $S_3$ will not be detected by the proximity sensor (414B). However, since $S_3$ is encompassed by the full-operational range, the combined output signal generated for the full-operational range provides information regarding the potential hazard in $S_3$. In particular, since the full-operational range is a union of the first-operational range and the second-operational range ($S_1 \cup S_2 \cup S_3 \cup S_4$), the combined output signal containing hazard-related data is generated as soon as the potential hazard is detected within the first-operational range or the second-operational range. Even though only the first-detection device 414A and the second-detection device 414B are described by way of example, additional detection devices can also be utilized to generate the full-operational range.

Figure 3:
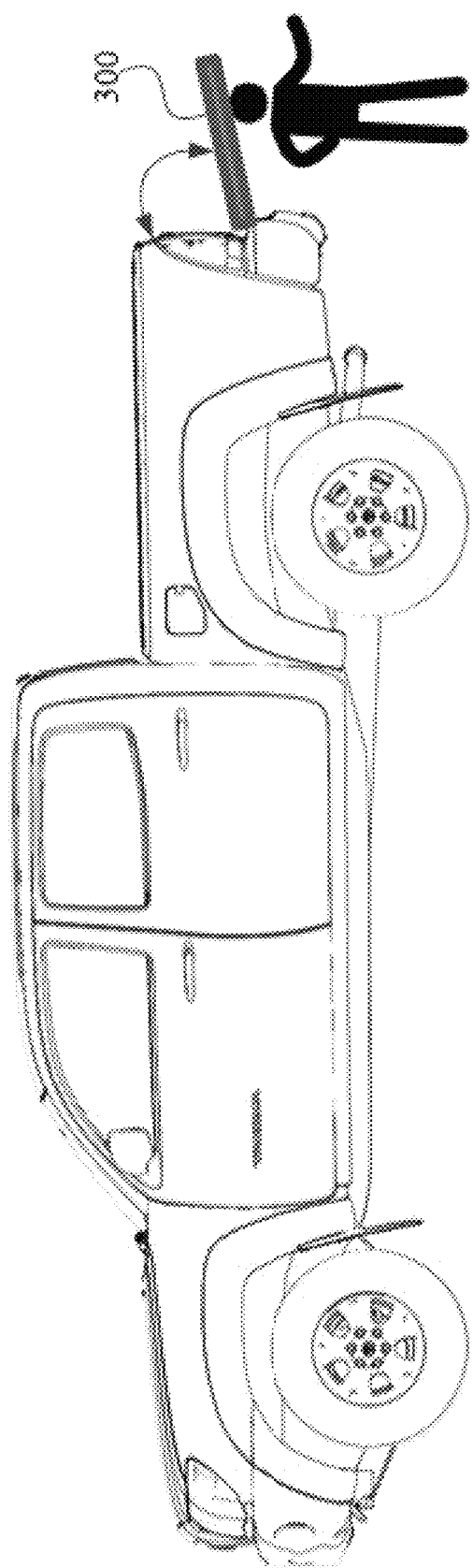
FIG. 3 is an illustration of an exemplary embodiment of the present disclosure wherein the method/system is implemented in a tailgate of a pickup truck.

As pointed out above, the physical closure member 718 can be a tailgate 300 of a pickup truck. By implementing the method/system of the present disclosure, damage caused by opening the tailgate 300 towards a wall or other comparable hazard can be prevented. As shown in FIG. 3, in another instance, potential injury can be prevented by not opening the tailgate 300 towards an individual in the immediate vicinity of the tailgate 300. In addition to the present disclosure's applicability to a tailgate, the physical closure member 718 can be, but is not limited to, a hood panel or a door. If the automobile has a retractable roof, the physical closure member 718 can also be a roof panel by way of non-limiting examples.

The processing, circuitry selects between the open configuration and the closed configuration for the physical closure member 718 by analyzing and comparing the hazard-related data with the cumulative safety threshold of the physical closure member 718. The cumulative safety threshold, which is a predetermined value, is based upon the minimum requirements that need to be satisfied for the physical closure member 718 to open/close safely. The cumulative safety threshold can be determined as function of a range of motion and an operational-time required to open/close the physical closure member 718, among other things. On the other hand, the hazard-related data can include, but is not limited to, direction-related information, position-related information, and speed-related information of a potential hazard.

Further referring to FICi.3, wherein the method/system of the present disclosure is implemented to control the tailgate 300 and a child is in the vicinity of the tailgate 300, the hazard-related data can be, but is not limited to, the height of child, a distance between a rear-end of the pickup truck and the child, a moving speed of child, and a moving direction of child. On the other hand, the cumulative safety threshold can be based upon information that can be, but is not limited to, the vertical height from ground when the tailgate 300 is open, the horizontal distance between a rear-end of the pickup truck and a distal end of the tailgate 300 when the tailgate 300 is open, and a time to open/close the tailgate 300. Therefore, during the analyzing and comparing process executed by the processing circuitry, the speed of the child moving towards the tailgate 300 can be compared with the time required to open the tailgate 300. If the time required to open the tailgate 300 is significantly less than the time the child would take to reach the tailgate 300, the tailgate 300 is opened. In another instance, if the child is stationary at a distance significantly greater than the horizontal distance from the rear end to the distal end, the tailgate 300 is opened.

In general, when the method/system of the present disclosure is implemented, the following process flow is followed. If a potential hazard is in the vicinity of the physical closure member 718, the first-detection device 414A and/or the second-detection device 414E detects the potential hazard, generates the combined output signal, and transfers the combined output signal to the processing circuitry. The hazard-related data of the combined output signal provides the direction, the position, the speed, and other relatable data regarding the potential hazard. By analyzing the hazard-related data, the predictive calculation module managed by the processing circuitry determines if the physical closure member 718 can be opened/closed without making contact with the potential hazard. To do so, the hazard-related data is compared with the cumulative safety threshold. If the predictive calculation module determines that no damage or injury would be caused by opening/closing the physical closure member 718, the physical closure member 71g changes the current state. If the predictive calculation module determines that the physical closure member 718 would make contact with the potential hazard, the physical closure member 718 maintains the current state. The mechanisms used to prevent the physical closure member 718 from opening/closing can vary.

Returning to FIG. 4. the process data and instructions may be stored in memory 702. These processes and instructions may also be stored on a storage medium disk 704 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM EPROM, EEPROM, hard disk or any other information processing device with which the hazard-detection system communicates, such as a server or computer.

Further, the claimed advancements may he provided as a utility application, background daemon, or component of an operating system, or combination thereof, executing in conjunction with CPU 700 and an operating system such as Microsoft Windows 7, UNIX, Solaris, LINUX, Apple MAC-OS and other systems known to those skilled in the art.

The hardware elements in order to achieve the hazard-detection system may be realized by various circuitry elements, known to those skilled in the art. For example, CPU 700 may be a Xenon or Core processor from Intel of America or an Opteron processor from AMD of America, or may be other processor types that would be recognized by one of ordinary skill in the art. Alternatively, the CPU 700 may be implemented on an FPGA, ASIC, PLD or using discrete logic circuits, as one of ordinary skill in the art would recognize. Further, CPU 700 may be implemented as multiple processors cooperatively working in parallel to perform the instructions of the inventive processes described above.

A sound controller 720 such as Sound Blaster X-Fi Titanium from Creative can also be provided in the hazard-detection system if a notification module is employed. The general purpose storage controller 724 connects the storage medium disk 704 with communication bus 726, which may be an ISA, EISA, VESA, PCI, or similar, for interconnecting all of the components of the hazard-detection system.

The hazard-detection system further includes a display controller 708, such as a NVIDIA GeForce GTX or Quadro graphics adaptor from NVIDLA Corporation of America for interfacing with display 710, such as a Hewlett Packard HPL2445w LCD monitor. A general purpose I/O interface 712 interfaces with a display 710.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method of using detection devices for hazard detection when activating a physical closure member of an automobile, comprising:
   generating a combined output signal from a first-detection device having a first operational range and a second-detection device having a second operational range in which the second operational range shares a border with the first operational range and does not overlap the first operational range, the first-detection device and the second-detection device being used for autonomous applications of the automobile, wherein the combined output signal is generated for activity detected within a full-operational range corresponding to a mathematical union of the first-operational range and the second-operational range;
   determining, using processing circuitry, a cumulative safety threshold for activating a physical closure member;
   analyzing hazard-related data contained within the combined output signal using the processing circuitry;
   determining whether the hazard-related data exceeds the cumulative safety threshold;
   changing a current state of the physical closure member when the hazard-related data exceeds the cumulative safety threshold; and
   maintaining a current state of the physical closure member when the hazard-related data does not exceed the cumulative safety threshold,
   wherein the physical closure member is remotely operated when the automobile is in a static condition.

2. The method of using detection devices for hazard detection according to claim 1, further comprising:
   issuing a notification to a user when the hazard-related data does not exceed the cumulative safety threshold.

3. The method of using detection devices for hazard detection according to claim 2, wherein the notification is an audible alarm.

4. The method of using detection devices for hazard detection according to claim 2, wherein the notification is a text message.

5. The method of using detection devices for hazard detection according to claim 2, wherein the notification is a warning light.

6. The method of using detection devices for hazard detection according to claim 2, wherein the notification is a vibrating motion.

7. The method of using detection devices for hazard detection according to claim 1, wherein the physical closure member is a tailgate.

8. The method of using detection devices for hazard detection according to claim 1, wherein the physical closure member is a roof panel.

9. The method of using detection devices for hazard detection according to claim 1, wherein the physical closure member is a hood panel.

10. The method of using detection devices for hazard detection according to claim 1, wherein the physical closure member is a door.

11. The method of using detection devices for hazard detection according to claim 1, wherein the hazard-related data includes direction-related information.

12. The method of using detection devices for hazard detection according to claim 1, wherein the hazard-related data includes position-related information.

13. The method of using detection devices for hazard detection according to claim 1, wherein the hazard-related data includes speed-related information.

14. A control apparatus for activating a physical closure member of an automobile, comprising:
   processing circuitry configured to
   generate a combined output signal from a first-detection device having a first operational range and a second-detection device having a second operational range in which the second operational range is adjacent to shares a border with the first operational range and does not overlap the first operational range, the first-detection device and the second-detection device being used for autonomous applications of the automobile, wherein the combined output signal is generated for activity detected within a full-operational range corresponding to a mathematical union of the first operational range and the second operational range;
   determine a cumulative safety threshold for activating the physical closure member;
   analyze hazard-related data contained within the combined output signal using the processing circuitry;
   determine whether the hazard-related data exceeds the cumulative safety threshold;
   change a current state of the physical closure member when the hazard-related data exceeds the cumulative safety threshold; and maintain a current state of the physical closure member when the hazard-related data does not exceed the cumulative safety threshold, wherein the processing circuitry is configured to remotely operate the physical closure member when the automobile is in a static condition.

15. The method of using detection devices for hazard detection according to claim 1, further comprising calibrating the first detection device and the second detection device for the full-operational range at first use.

16. The method of using detection devices for hazard detection according to claim 1, wherein the hazard-related data includes information regarding an individual walking away from the physical closure member.

\* \* \* \* \*